United States Patent
Shen et al.

(10) Patent No.: US 10,089,514 B1
(45) Date of Patent: Oct. 2, 2018

(54) ADAPTIVE REFERENCE FOR DIFFERENTIAL CAPACITIVE MEASUREMENTS

(71) Applicant: Synaptics Incorporated, San Jose, CA (US)

(72) Inventors: Guozhong Shen, San Jose, CA (US); Ozan Ersan Erdogan, Saratoga, CA (US); Mandar Kulkarni, San Jose, CA (US); Taehee Cho, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 15/475,835

(22) Filed: Mar. 31, 2017

(51) Int. Cl.
| | |
|---|---|
| *G06K 9/28* | (2006.01) |
| *G06K 9/00* | (2006.01) |
| G06F 3/044 | (2006.01) |
| G06F 3/041 | (2006.01) |

(52) U.S. Cl.
CPC ....... *G06K 9/0002* (2013.01); *G06K 9/00067* (2013.01); *G06K 9/00087* (2013.01); *G06F 3/044* (2013.01); *G06F 3/0416* (2013.01)

(58) Field of Classification Search
CPC ............ G06K 9/0002; G06K 9/00006–9/0012
See application file for complete search history.

(56) References Cited

U.S. PATENT DOCUMENTS

| | | |
|---|---|---|
| 7,075,316 B2 | 7/2006 | Umeda et al. |
| 7,078,918 B2 | 7/2006 | Umeda et al. |
| 7,084,645 B1 | 8/2006 | Umeda et al. |
| 7,088,461 B2 | 8/2006 | Miyano |
| 7,102,364 B2 | 9/2006 | Umeda et al. |

(Continued)

FOREIGN PATENT DOCUMENTS

| | | |
|---|---|---|
| CN | 100367039 | 2/2008 |
| CN | 100392666 | 6/2008 |

(Continued)

*Primary Examiner* — Brian Werner
(74) *Attorney, Agent, or Firm* — Leydig, Voit & Mayer, Ltd.

(57) ABSTRACT

An input device for capacitive sensing includes: a plurality of sensor electrodes, the plurality of sensor electrodes comprising a plurality of transmitter electrodes and a plurality of receiver electrodes, wherein the plurality of transmitter electrodes is configured to be driven by sensing signals and the plurality of receiver electrodes is configured to receive detected signals corresponding to respective sensing signals driven onto the plurality of transmitter electrodes; and a processing system, configured to: determine which receiver electrodes of the plurality of receiver electrodes are covered by an input biometric object; and scan the input biometric object to determine features of the input biometric object, wherein scanning the input biometric object comprises performing a differential measurement for one or more receiver electrodes with other receiver electrodes providing a reference, based on detected signals received on the one or more receiver electrodes and the other receiver electrodes, wherein the other receiver electrodes providing the reference are all receiver electrodes of the plurality of receiver electrodes that are determined as being covered by the input biometric object.

20 Claims, 9 Drawing Sheets

(56) References Cited

U.S. PATENT DOCUMENTS

| | | |
|---|---|---|
| 7,570,789 B2 | 8/2009 | Fujiyoshi |
| 7,868,874 B2 | 1/2011 | Reynolds |
| 8,338,724 B2 | 12/2012 | Reynolds |
| 8,339,286 B2 | 12/2012 | Cordeiro |
| 8,558,811 B2 | 10/2013 | Reynolds |
| 8,952,916 B2 | 2/2015 | Reynolds |
| 2008/0047764 A1 | 2/2008 | Lee et al. |
| 2008/0158182 A1 | 7/2008 | Westerman |
| 2009/0135157 A1 | 5/2009 | Harley |
| 2013/0258142 A1 | 10/2013 | Russo |
| 2014/0015793 A1 | 1/2014 | Chen et al. |
| 2014/0198960 A1 | 7/2014 | Thompson et al. |
| 2014/0361395 A1* | 12/2014 | Bhagavat .......... H01L 27/14634 257/448 |
| 2016/0227142 A1* | 8/2016 | Lin .................... G06K 9/00013 |
| 2016/0291765 A1 | 10/2016 | Shen et al. |
| 2016/0291766 A1 | 10/2016 | Shen et al. |
| 2018/0012057 A1* | 1/2018 | Cho ........................ G06F 3/041 |

FOREIGN PATENT DOCUMENTS

| | | |
|---|---|---|
| JP | 4036798 B2 | 1/2008 |
| JP | 4164427 B2 | 10/2008 |
| JP | 4364609 B2 | 11/2009 |
| JP | 4387773 B2 | 12/2009 |
| JP | 4440603 B2 | 3/2010 |
| JP | 4447952 B2 | 4/2010 |
| JP | 4496065 B2 | 7/2010 |

* cited by examiner

ADAPTIVE REFERENCE FOR DIFFERENTIAL CAPACITIVE MEASUREMENTS

BACKGROUND

Input devices, including touch sensor devices (also commonly called touchpads or proximity sensor devices), as well as fingerprint sensor devices, are widely used in a variety of electronic systems.

Touch sensor devices typically include a sensing region, often demarked by a surface, in which the touch sensor device determines the presence, location and/or motion of one or more input objects, typically for purposes allowing a user to provide user input to interact with the electronic system.

Fingerprint sensor devices also typically include a sensing region in which the fingerprint sensor device determines presence, location, motion, and/or features of a fingerprint or partial fingerprint, typically for purposes relating to user authentication or identification of a user.

Touch sensor devices and fingerprint sensor devices may thus be used to provide interfaces for the electronic system. For example, touch sensor devices and fingerprint sensor devices are often used as input devices for larger computing systems (such as opaque touchpads and fingerprint readers integrated in or peripheral to notebook or desktop computers). Touch sensor devices and fingerprint sensors are also often used in smaller computing systems (such as touch screens integrated in mobile devices such as smartphones and tablets).

SUMMARY

In an exemplary embodiment, an input device for capacitive sensing includes: a plurality of sensor electrodes, the plurality of sensor electrodes comprising a plurality of transmitter electrodes and a plurality of receiver electrodes, wherein the plurality of transmitter electrodes is configured to be driven by sensing signals and the plurality of receiver electrodes is configured to receive detected signals corresponding to respective sensing signals driven onto the plurality of transmitter electrodes; and a processing system, configured to: determine which receiver electrodes of the plurality of receiver electrodes are covered by an input biometric object; and scan the input biometric object to determine features of the input biometric object, wherein scanning the input biometric object comprises performing a differential measurement for one or more receiver electrodes with other receiver electrodes providing a reference, based on detected signals received on the one or more receiver electrodes and the other receiver electrodes, wherein the other receiver electrodes providing the reference are all receiver electrodes of the plurality of receiver electrodes that are determined as being covered by the input biometric object.

In another exemplary embodiment, a method for capacitive sensing includes: determining, by a processing system of an input device comprising a plurality of receiver electrodes and a plurality of transmitter electrodes, which receiver electrodes of the plurality of receiver electrodes are covered by an input biometric object; and scanning, by the processing system, the input biometric object, wherein scanning the input biometric object comprises performing a differential measurement for one or more receiver electrodes with other receiver electrodes providing a reference, based on detected signals received on the one or more receiver electrodes and the other receiver electrodes, wherein the other receiver electrodes providing the reference are all receiver electrodes of the plurality of receiver electrodes that are determined as being covered by the input biometric object.

In yet another exemplary embodiment, a processing system for capacitive sensing includes: a non-transitory, computer-readable medium having processor-executable instructions stored thereon; and a processor, configured, based on execution of the processor-executable instructions, for: determining which receiver electrodes of the plurality of receiver electrodes are covered by an input biometric object; and scanning the input biometric object to determine features of the input biometric object, wherein scanning the input biometric object comprises performing a differential measurement for one or more receiver electrodes with other receiver electrodes providing a reference, based on detected signals received on the one or more receiver electrodes and the other receiver electrodes, wherein the other receiver electrodes providing the reference are all receiver electrodes of the plurality of receiver electrodes that are determined as being covered by the input biometric object.

DETAILED DESCRIPTION

The following detailed description is exemplary in nature and is not intended to limit the disclosure or the application and uses of the disclosure. Furthermore, there is no intention to be bound by any expressed or implied theory presented in the preceding background, summary and brief description of the drawings, or the following detailed description.

Figure 1:
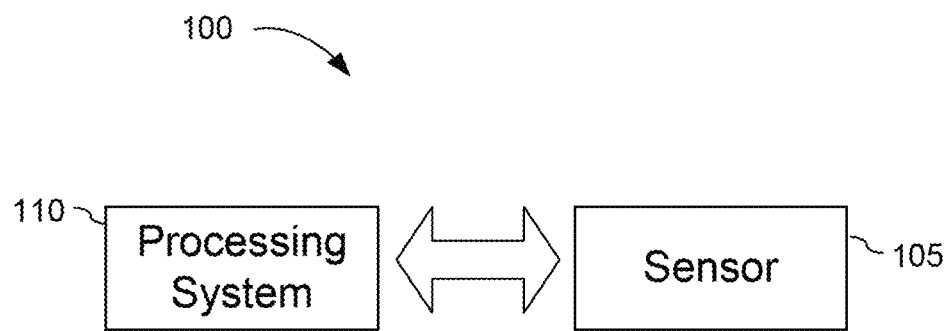
FIG. 1 is a block diagram of an example input device and processing system.

FIG. 1 is a block diagram depicting an example input device 100. The input device 100 may be configured to provide input to an electronic system. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, personal digital assistants (PDAs), and wearable computers (such as smart watches and activity tracker devices). Additional examples of electronic systems include composite input devices, such as physical keyboards that include input device 100 and separate joysticks or key switches. Further examples of electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system may be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include Inter-Integrated Circuit (I2C), Serial Peripheral Interface (SPI), Personal System/2 (PS/2), Universal Serial Bus (USB), Bluetooth, radio frequency (RF), and Infrared Data Association (IRDA).

In FIG. 1, a sensor 105 is included with the input device 100. The sensor 105 comprises one or more sensing elements configured to sense input provided by one or more input objects in a sensing region. Examples of input objects include fingers, styli, and hands. The sensing region encompasses any space above, around, in and/or near the sensor 105 in which the input device 100 is able to detect user input (e.g., user input provided by one or more input objects). The sizes, shapes, and locations of particular sensing regions may vary from embodiment to embodiment. In some embodiments, the sensing region extends from a surface of the input device 100 in one or more directions into space until signal-to-noise ratios prevent sufficiently accurate object detection. The distance to which this sensing region extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of sensor substrates within which or on which sensor elements are positioned, or by face sheets or other cover layers positioned over sensor elements.

The input device 100 comprises one or more sensing elements for detecting user input. Some implementations utilize arrays or other regular or irregular patterns of sensing elements to detect the input object. The input device 100 may utilize different combinations of sensor components and sensing technologies to detect user input in the sensing region 120.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects. In another implementation, an absolute capacitance sensing method operates by modulating a drive ring or other conductive element that is ohmically or capacitively coupled to the input object, and by detecting the resulting capacitive coupling between the sensor electrodes and the input object. The reference voltage may by a substantially constant voltage or a varying voltage and in various embodiments; the reference voltage may be system ground.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "drive electrodes") and one or more receiver sensor electrodes (also "receiver electrodes" or "pickup electrodes"). Transmitter sensor electrodes may be modulated relative to a reference voltage to transmit transmitter signals. Receiver sensor electrodes may be held substantially constant relative to the reference voltage to facilitate receipt of resulting signals. The reference voltage may be, for example, a substantially constant voltage or system ground. In some embodiments, transmitter sensor electrodes and receiver sensor electrodes may both be modulated. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In other exemplary implementations, the input device 100 may utilize optical sensing techniques where one or more sensing elements detect light from the sensing region. The detected light may be reflected from the input object, transmitted through the input object, emitted by input object, or some combination thereof. The detected light may be in the visible or invisible spectrum (such as infrared or ultraviolet light). Example optical sensing elements include photodiodes, complementary metal-oxide-semiconductor (CMOS) image sensor arrays, charge-coupled device (CCD) arrays, photodiodes, and other suitable photosensors sensitive to light in wavelength(s) of interest. Active illumination may be used to provide light to the sensing region, and reflections from the sensing region in the illumination wavelength(s) may be detected to determine input information corresponding to the input object.

One exemplary optical technique utilizes direct illumination of the input object, which may or may not be in contact with an input surface of the sensing region depending on the configuration. One or more light sources and/or light guiding structures are used to direct light to the sensing region. When an input object is present, this light is reflected directly from surfaces of the input object, which reflections can be detected by the optical sensing elements and used to determine input information about the input object.

Another exemplary optical technique utilizes indirect illumination based on internal reflection to detect input objects in contact with an input surface of the sensing region. One or more light sources are used to direct light in a transmitting medium at an angle at which it is internally reflected at the input surface of the sensing region, due to different refractive indices at opposing sides of the interface defined by the input surface. Contact of the input surface by the input object causes the refractive index to change across this boundary, which alters the internal reflection characteristics at the input surface. Higher contrast signals can often be achieved if principles of frustrated total internal reflection (FTIR) are used to detect the input object, where the light is directed to the input surface at an angle of incidence at which it is totally internally reflected, except at locations where the input object is in contact and causes the light to partially transmit across this interface. An example of this is presence of a finger introduced to an input surface defined by a glass to air interface. The higher refractive index of human skin compared to air causes light incident at the input surface at the critical angle of the interface to air to be partially transmitted through the finger, where it would otherwise be totally internally reflected at the glass to air interface. This optical response can be detected by the system and used to determine spatial information. In some embodiments, this can be used to image small scale surface variations of the input object, such as fingerprint patterns, where the internal reflectivity of the incident light differs depending on whether a ridge or valley of the finger is in contact with that portion of the input surface.

Some implementations of the input device 100 are configured to provide images that span one, two, three, or higher dimensional spaces. The input device 100 may have a sensor resolution that varies from embodiment to embodiment depending on factors such as the particular sensing technology involved and/or the scale of information of interest. In some embodiments, the sensor resolution is determined by the physical arrangement of an array of sensing elements, where smaller sensing elements and/or a smaller pitch can be used to define a higher sensor resolution.

The input device 100 may be implemented as a fingerprint sensor having a sensor resolution high enough to capture discriminative features of a fingerprint. In some implementations, the fingerprint sensor has a resolution sufficient to capture minutia (including ridge endings and bifurcations), orientation fields (sometimes referred to as "ridge flows"), and/or ridge skeletons. These are sometimes referred to as level 1 and level 2 features, and in an exemplary embodiment, a resolution of at least 250 pixels per inch (ppi) is capable of reliably capturing these features. In some implementations, the fingerprint sensor has a resolution sufficient to capture higher level features, such as sweat pores or edge contours (i.e., shapes of the edges of individual ridges). These are sometimes referred to as level 3 features, and in an exemplary embodiment, a resolution of at least 750 pixels per inch (ppi) is capable of reliably capturing these higher level features.

In some embodiments, a fingerprint sensor is implemented as a placement sensor (also "area" sensor or "static" sensor) or a swipe sensor (also "slide" sensor or "sweep" sensor). In a placement sensor implementation, the sensor is configured to capture a fingerprint input as the user's finger is held stationary over the sensing region. Typically, the placement sensor includes a two dimensional array of sensing elements capable of capturing a desired area of the fingerprint in a single frame. In a swipe sensor implementation, the sensor is configured to capture to a fingerprint input based on relative movement between the user's finger and the sensing region. Typically, the swipe sensor includes a linear array or a thin two-dimensional array of sensing elements configured to capture multiple frames as the user's finger is swiped over the sensing region. The multiple frames may then be reconstructed to form an image of the fingerprint corresponding to the fingerprint input. In some implementations, the sensor is configured to capture both placement and swipe inputs.

In some embodiments, a fingerprint sensor is configured to capture less than a full area of a user's fingerprint in a single user input (referred to herein as a "partial" fingerprint sensor). Typically, the resulting partial area of the fingerprint captured by the partial fingerprint sensor is sufficient for the system to perform fingerprint matching from a single user input of the fingerprint (e.g., a single finger placement or a single finger swipe). Some exemplary imaging areas for partial placement sensors include an imaging area of 100 $mm^2$ or less. In another exemplary embodiment, a partial placement sensor has an imaging area in the range of 20-50 $mm^2$. In some implementations, the partial fingerprint sensor has an input surface that is the same size the imaging area.

In FIG. 1, a processing system 110 is included with the input device 100. The processing system 110 comprises parts of or all of one or more integrated circuits (ICs) and/or other circuitry components. The processing system 110 is coupled to the sensor 105, and is configured to detect input in the sensing region using sensing hardware of the sensor 105.

The processing system 110 may include driver circuitry configured to drive sensing signals with sensing hardware of the input device 100 and/or receiver circuitry configured to receive resulting signals with the sensing hardware. For example, a processing system for a mutual capacitance sensor device may be configured to drive transmit signals onto transmitter sensor electrodes of the sensor 105, and/or receive resulting signals detected via receiver sensor electrodes of the sensor 105. Further, a processing system for a self capacitance sensor device may be configured to drive absolute capacitance signals onto sensor electrodes of the sensor 105, and/or receive resulting signals detected via those sensor electrodes of the sensor 105. In another example, a processing system for an optical sensor device may be configured to drive one or more light-emitting diodes (LEDs) or other light sources, and/or receive resulting signals via optical receiving elements of the sensor 105.

The processing system 110 may include processor-readable instructions, such as firmware code, software code, and/or the like. The processing system 110 can be implemented as a physical part of the sensor 105, or can be physically separate from the sensor 105. Also, constituent components of the processing system 110 may be located together, or may be located physically separate from each other. For example, the input device 100 may be a peripheral coupled to a computing device, and the processing system 110 may comprise software configured to run on a central processing unit of the computing device and one or more ICs (e.g., with associated firmware) separate from the central processing unit. As another example, the input device 100 may be physically integrated in a mobile device, and the processing system 110 may comprise circuits and firmware that are part of a main processor of the mobile device. The processing system 110 may be dedicated to implementing the input device 100, or may perform other functions, such as operating display screens, driving haptic actuators, etc.

The processing system 110 may operate the sensing element(s) of the sensor 105 of the input device 100 to produce electrical signals indicative of input (or lack of input) in a sensing region. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, match biometric samples, and the like.

The sensing region of the input device 100 may overlap part or all of an active area of a display device, for example, if the sensor 105 provides a touch screen interface. The display device may be any suitable type of dynamic display capable of displaying a visual interface to a user, including an inorganic LED display, organic LED (OLED) display, cathode ray tube (CRT), liquid crystal display (LCD), plasma display, electroluminescence (EL) display, or other display technology. The display may be flexible or rigid, and may be flat, curved, or have other geometries. The display may include a glass or plastic substrate for thin-film transistor (TFT) circuitry, which may be used to address display pixels for providing visual information and/or providing other functionality. The display device may include a cover lens (sometimes referred to as a "cover glass") disposed above display circuitry and above inner layers of the display module, and the cover lens may also provide an input surface for the input device 100. Examples of cover lens materials include optically clear amorphous solids, such as chemically hardened glass, and optically clear crystalline structures, such as sapphire. The input device 100 and the display device may share physical elements. For example, some of the same electrical components may be utilized for both displaying visual information and for input sensing with the input device 100, such as using one or more display electrodes for both display updating and input sensing. As another example, the display screen may be operated in part or in total by the processing system 110 in communication with the input device.

Figure 2A:
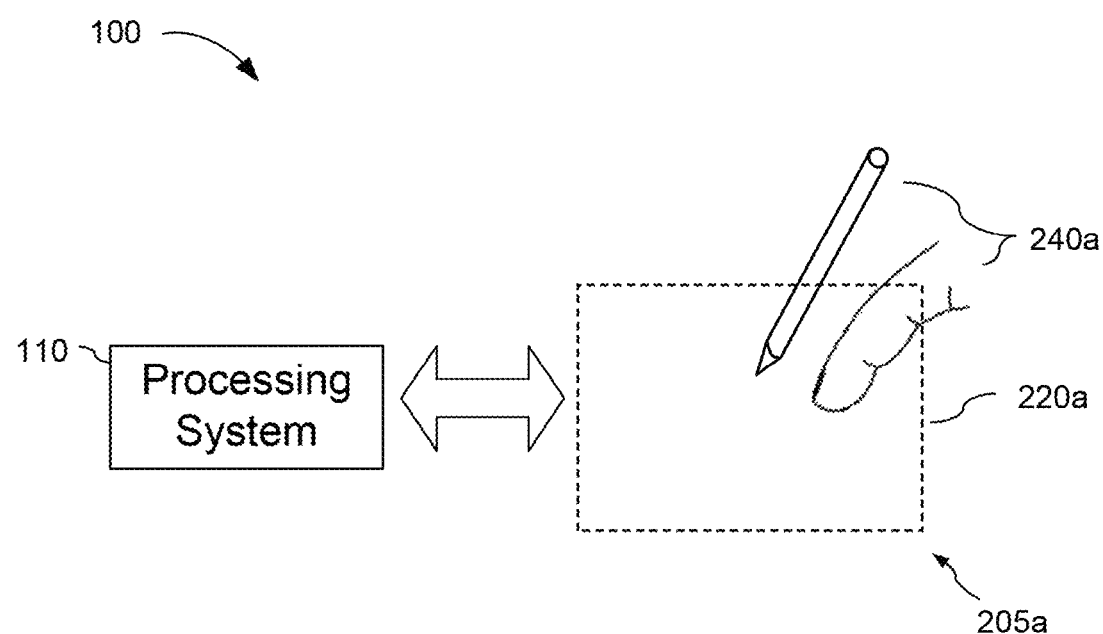
FIGS. 2A-2B are block diagrams of further example input devices.
Figure 2B:
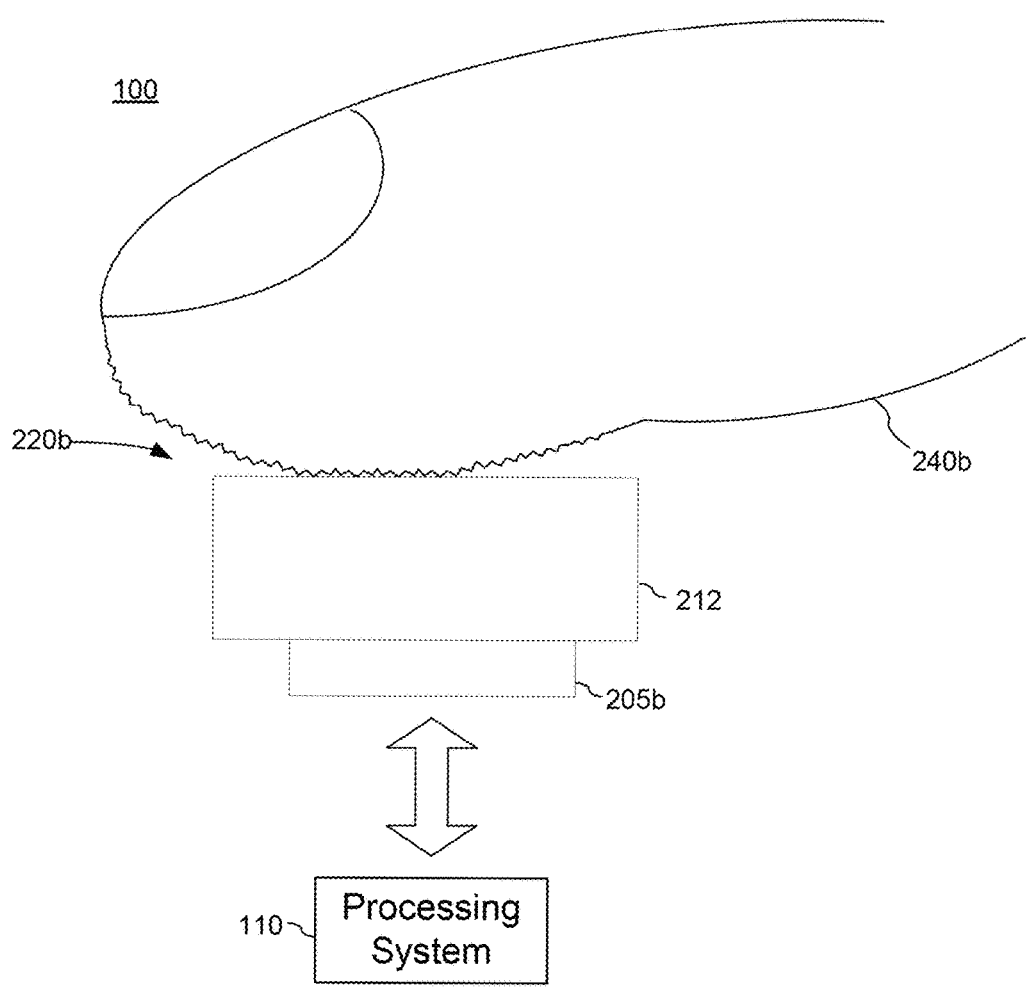

FIGS. 2A-2B are block diagrams depicting further exemplary input devices. In FIG. 2A, the input device 100 is shown as including a touch sensor 205a. The touch sensor 205a is configured to detect position information of an input object 240a within the sensing region 220a. The input object 240a may include a finger or a stylus, as shown in FIG. 2A. The sensing region 220a may include an input surface having a larger area than the input object. The touch sensor 205a may include an array of sensing elements with a resolution configured to detect a location of a touch to the input surface.

In FIG. 2B, the input device 100 is shown as including a fingerprint sensor 205b. The fingerprint sensor 205b is configured to capture a fingerprint from a finger 240b. The fingerprint sensor 205b is disposed underneath a cover layer 212 that provides an input surface for the fingerprint to be placed on or swiped over the fingerprint sensor 205b. The sensing region 220b may include an input surface with an area larger than, smaller than, or similar in size to a full fingerprint. The fingerprint sensor 205b has an array of sensing elements with a resolution configured to detect surface variations of the finger 240b, and the fingerprint sensor 205b has a higher resolution than the touch sensor 205a of FIG. 2A.

Figure 3:
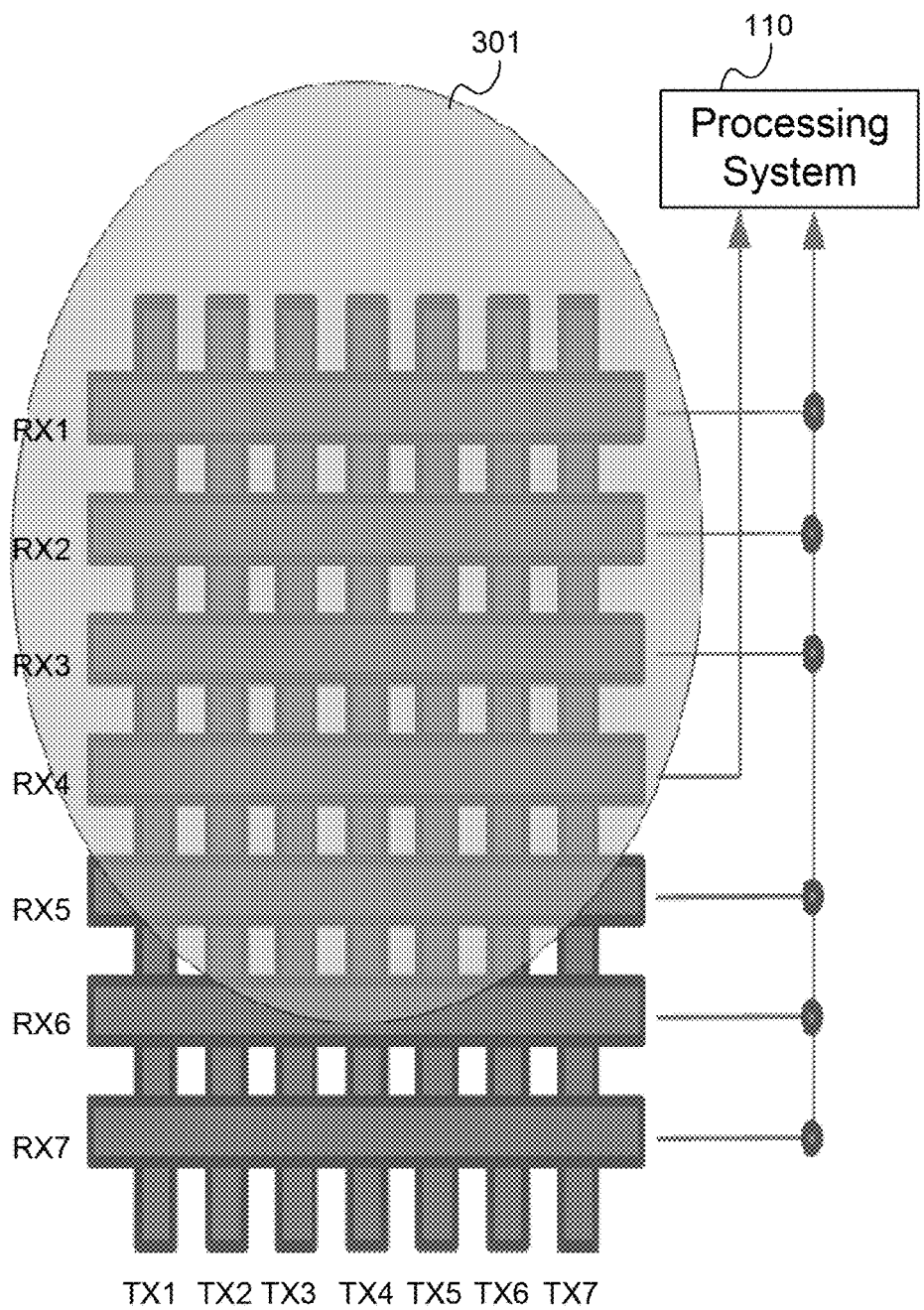
FIG. 3 is a schematic diagram of an example capacitive sensor and a processing system.

FIG. 3 is a schematic diagram of an exemplary capacitive sensor and a processing system. In this example, when one or more receiver lines (or "receiver sensor electrodes") is/are read, the reading(s) on the receiver line(s) being read is/are compared with the average of readings on other receiver lines which are used as reference receiver lines. For example, as shown in FIG. 3, when obtaining an output at one or more pixels corresponding to the fourth receiver line (RX4), some or all of the remaining receiver lines may be used as reference lines. A difference between the reading on receiver line RX4 and the average of the readings on the reference receiver lines (the average is produced by shorting the reference receiver lines together) is obtained and amplified via a low-noise amplifier (LNA) of the processing system 110.

It will be appreciated that, in some implementations, one transmission line (or "transmission sensor electrode") may be driven at a time and thus only one pixel of a receiver line is measured at a time. In other implementations (e.g., those utilizing multiple simultaneous drive or code-division multiplexing (CDM)), multiple transmission lines may be driven at a time and thus measurements may be taken for multiple or all pixels of a receiver line at a time. In further implementations, in addition to driving multiple transmission lines at a time, multiple receiver lines may be measured at a time.

It will further be appreciated that, when utilizing multiple simultaneous drive or CDM, a zero rowsum or a non-zero rowsum for the transmitter lines may be used. A "rowsum" refers to one stage of simultaneous driving in a multi-stage sequence (e.g., one row of a drive matrix in a CDM convention). For a non-zero rowsum, during one stage of simultaneous driving of the transmitter lines with some having different phase than others, the sum of all phases of the transmitter lines would be non-zero. Similarly, for a zero rowsum, during one stage of simultaneous driving of the transmitter lines with some having different phase than others, the sum of all phases of the transmitter lines would be equal to zero.

The averaged reference signal from the reference receiver lines will typically fall somewhere between the measured signal level for a ridge or for a valley, since the reference receiver lines are covered by a mixture of ridges and valleys. Thus, the configuration shown in FIG. 3 generally allows for the processing system 110 to distinguish between ridges and valleys at each pixel while mitigating the effects of environmental noise (since the same environmental noise is present at the receiver line being read as is present at the other receiver lines providing the reference).

However, a problem arises when an input biometric object for which an image is being captured does not completely cover the sensing area. For example, if a fingerprint is placed on a capacitive fingerprint sensor and only about 80% of the receiver electrodes are covered, the quality of the captured image of the fingerprint may be severely degraded due to saturation effects, leading to an increase in false rejections. The readings on the reference receiver lines not covered by the fingerprint cause the averaged reference signal to be skewed such that the difference between the averaged reference signal from the reference receiver lines and the measured signal on the receiver line being read is outside the dynamic range the components of the fingerprint sensor were designed for (the measurement circuits of the capacitive fingerprint sensor are typically tuned to measure the capacitive difference between ridges and valleys, which is much smaller than the capacitive difference between an uncovered pixel and a covered pixel). This is particularly problematic in fingerprint sensors as the thickness of a cover layer (e.g., including a cover glass and/or adhesive) above the capacitive sensor increases, as increasing the cover layer thickness causes the difference in capacitance for a ridge pixel versus a valley pixel to decrease at a much faster rate than the difference in capacitance for a covered pixel versus an uncovered pixel.

Figure 4A:
FIGS. 4A-4B are exemplary images of a fingerprint captured by a capacitive fingerprint sensor using a differential capacitive technique where receiver electrodes other than one or more receiver electrodes being read are used as reference receiver electrodes.
Figure 4B:
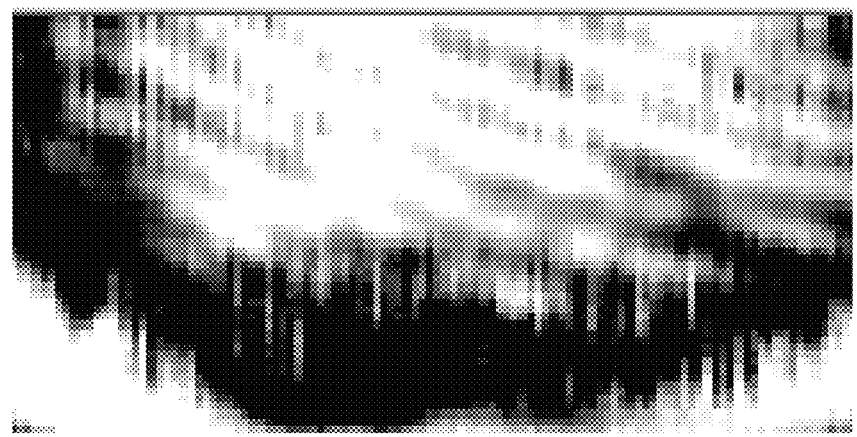

FIGS. 4A-4B are exemplary images of a fingerprint captured by a capacitive fingerprint sensor using the aforementioned type of differential capacitive configuration shown in FIG. 3, where receiver electrodes other than one or more receiver electrodes being read are used as reference receiver electrodes. These exemplary images were captured using a capacitive fingerprint sensor disposed beneath a cover layer having 250 μm layer of cover glass and a 20 um layer of optically-clear adhesive (OCA). FIG. 4A is an exemplary image captured while the fingerprint was covering the whole sensing area, leading to a relatively high quality image where the ridges and valleys of the fingerprint are clearly distinguishable. FIG. 4B, on the other hand, is an exemplary image captured while the fingerprint was not covering the whole sensing area (i.e., such that one or more receiver lines were left uncovered), leading to a relatively low quality image where features of the fingerprint are washed out and/or distorted.

Exemplary embodiments of the present disclosure provide methods and systems for achieving a high quality image even when the input object being imaged does not cover the entire sensing area. This may be achieved, for example, by performing an initial determination of which receiver electrodes of the capacitive sensor are covered (or not covered) by an input object, followed by scanning the object while using only those receiver electrodes that are covered by the input object as reference receiver electrodes for differential measurements.

Figure 5:
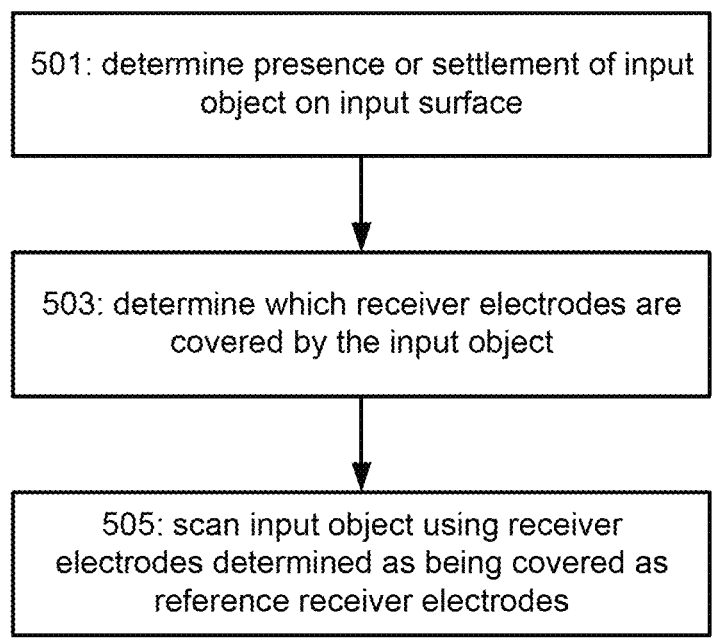
FIG. 5 is a flowchart illustrating an exemplary process for capacitive sensing in accordance with an exemplary embodiment.

FIG. 5 is a flowchart illustrating an exemplary process for capacitive sensing in accordance with an exemplary embodiment.

At stage 501, an input object, such as a biometric input object (e.g., a fingerprint) is placed on or over a capacitive sensor (or a swipe motion begins on the capacitive sensor), and the processing system determines the presence or settlement of the input object on the input surface.

At stage 503, the processing system for the capacitive sensor determines which receiver electrodes are covered by the input object. The step of determining which receiver electrodes are covered by the input object may take place after the determination of the presence or settlement of the input object at stage 501 (as depicted in FIG. 5). Alternatively, this step may be included within the process for determining the determination of the presence or settlement of the input objection at stage 501. For example, the processing system may utilize information from one or more presence or settlement scans to determine coverage of the receiver electrodes, or the processing system may add a coverage scan to the presence or settlement determination process (e.g., by inserting a coverage scan in between presence or settlement scans).

At stage 505, the processing system for the capacitive sensor performs the scan of the input object while using receiver electrodes determined as being covered by the input object as reference receiver electrodes (e.g., via a plurality of differential measurements between each receiver line being read and the covered receiver lines being used as reference, which allows various pixels of the sensor array to be identified as corresponding to ridges or valleys and/or an image of the input object to be captured).

In an exemplary implementation using simultaneous multiple drive (e.g., CDM) capacitive sensing, only one scan iteration was needed to accomplish stage 503 relative to a total of 144 scan iterations to capture an image of a fingerprint at stage 505 (i.e., only 0.7% of the total scan time was used for determining which receiver electrodes are covered/not covered). Accordingly, it was shown that embodiments of the disclosure discussed herein are able to provide a very short initial determination at stage 503 regarding which receiver electrodes are covered to avoid image degradation and undesirable false rejections caused by partial coverage/partial touch situations.

Figure 6:
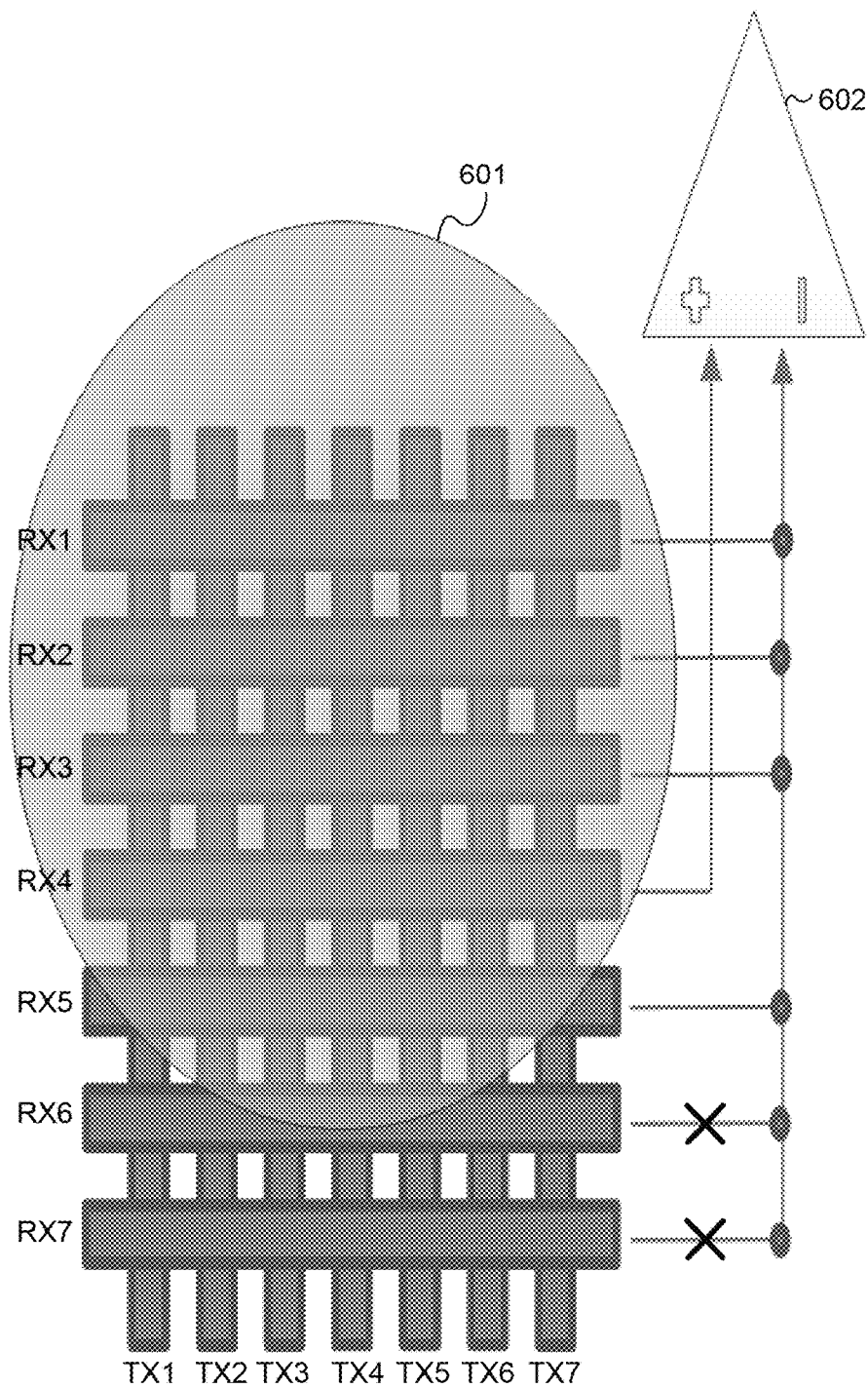
FIG. 6 is a schematic diagram illustrating the operation of components of a capacitive sensor and a processing system in an exemplary embodiment.

FIG. 6 is a schematic diagram illustrating the operation of components of a capacitive sensor and a processing system in an exemplary embodiment. FIG. 6 illustrates the placement of an input object 601, such as a fingerprint, onto a capacitive sensing area formed by the intersections between various receiver electrodes (RX1-RX7) and transmitter electrodes (TX1-TX7). In a full coverage situation, during a scan of the input object, when pixels on RX4 are being read, the measured signals on RX4 would be compared to the average of reference signals measured on RX1, RX2, RX3, RX5, RX6 and RX7 by LNA 602. However, because in this example only RX1-RX5 are covered by the input object 601, a determination of which receivers electrodes are covered or not covered (in accordance with stage 503 discussed above with respect to FIG. 5) leads to the scan being performed with RX1-RX5 being available as reference receiver electrodes while RX6-RX7 are excluded from being reference receiver electrodes (in accordance with stage 505 discussed above with respect to FIG. 5).

Thus, for example, while the input object 601 is being scanned, the measured signals on RX4 would be compared to the average of reference signals measured on RX1, RX2, RX3 and RX5 as illustrated in FIG. 6. It will be appreciated that although FIG. 6 only shows RX4 being read while RX1, RX2, RX3 and RX5 are used as a reference, the scan of the input object 601 would also include other RX electrodes being read (such as RX1 being read while RX2-RX5 are used as a reference, RX2 being read while RX1 and RX3-RX5 are used as a reference, RX3 being read while RX1-RX2 and RX4-RX5 are used as a reference, RX5 being read while RX1-RX4 are used as a reference, RX6 being read while RX1-RX5 are used as a reference, and/or RX7 being read while RX1-RX5 are used as a reference). It will further be appreciated that the scan may be performed in a simultaneous multiple drive and/or CDM manner where multiple transmitter electrodes are driven at a time, and/or be performed in a manner where multiple receiver electrodes are simultaneously read.

Although not depicted in FIG. 6, each receiver line and transmitter line may have a respective switch associated therewith, configured to disconnect/connect the receiver line or transmitter line to components of a processing system to coordinate operation of the sensor array). Thus, in an exemplary embodiment, during the scan of the input object 601, except for times at which RX6 or RX7 is being read, respective switches connected to RX6 and RX7 are set into an "off" or "disconnected" position to prevent signals from RX6 and RX7 from being included in the reference signal received by LNA 602.

Figure 7:
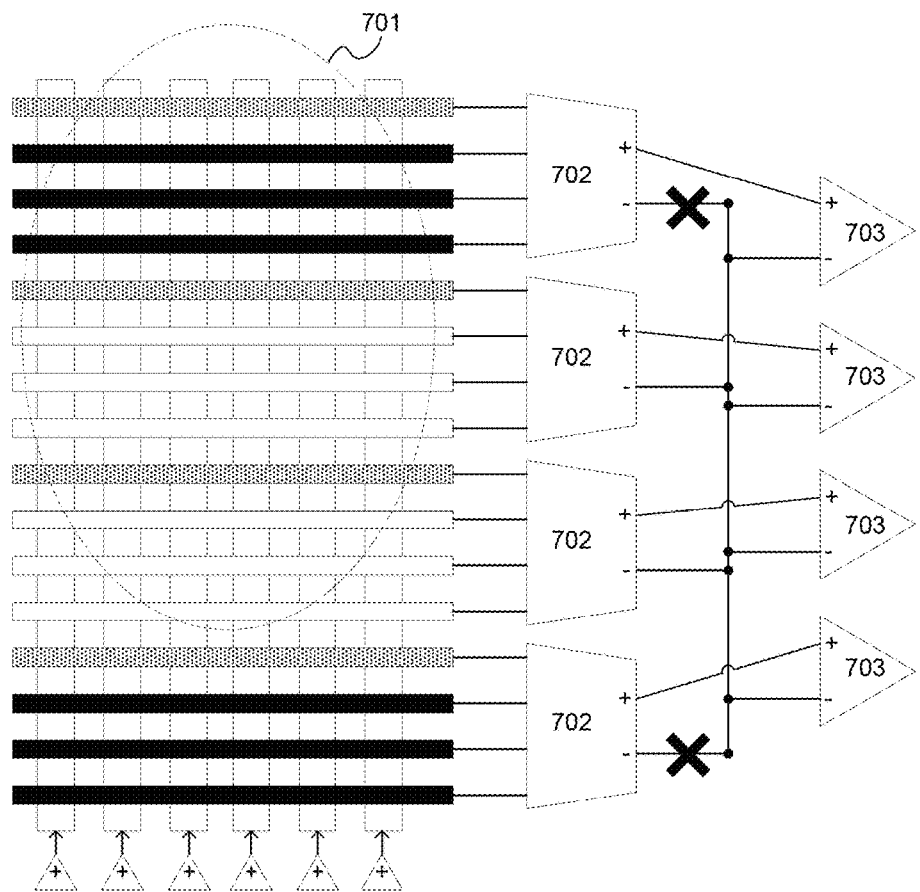
FIG. 7 is a schematic diagram illustrating the operation of components of a capacitive sensor and a processing system during a subframe of an initial coverage scan in an exemplary embodiment.
Figure 7:
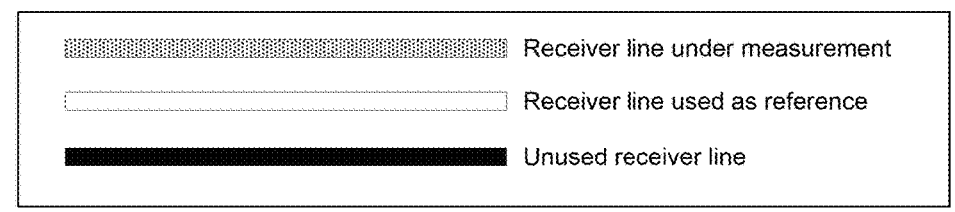

FIG. 7 is a schematic diagram illustrating the operation of components of a capacitive sensor and a processing system during a first subframe of an initial coverage scan in an exemplary embodiment. In this example, four receiver lines distributed throughout the sensing region are measured during the first subframe of the initial coverage scan, with six receiver lines disposed in a central area of the sensing region being used as reference receiver lines. Six other receiver lines, disposed near the top and bottom edges of the sensing region, are unused in the subframe. The usage of the six receiver lines disposed in the central area of the sensing region as reference receiver lines is based on an assumption that, even if there is partial coverage of the sensing region by an input object 701, the input object 701 is likely to cover the center of the sensing region.

In the exemplary configuration shown in FIG. 7, each measurement circuit includes a differential amplifier 703 (e.g., a low-noise amplifier (LNA)), which is connected to a set of receiver lines through a respective multiplexer (MUX) 702. Each MUX 702 includes one output terminal connected to a positive input terminal of one of the measurement circuits, and another output terminal that is connected to the negative input terminals of multiple measurement circuits (corresponding to a shared reference among the multiple differential amps). Each MUX 702 has multiple input terminals connecting it to a subset of the receiver lines (e.g., four input terminals corresponding to four receiver lines, as shown in FIG. 7), and the MUX selects which of the receiver lines connected to the inputs of the MUX goes to the positive input terminal of a corresponding differential amplifier (for measurement), with the remaining receiver lines going to a shared reference that is connected to the negative input terminals of multiple differential amplifiers. It will be appreciated that in other exemplary implementations, more or less receiver lines, more or less MUXs, and/or more or less differential amplifiers may be used, with each MUX corresponding to more or less input lines and/or more or less differential amplifiers.

The first subframe is followed by three additional subframes so as to provide measurements for all sixteen receiver lines during the initial coverage scan (e.g., a second subframe may include obtaining measurements for a second receiver line corresponding to each MUX, a third subframe may include obtaining measurements for a third receiver line corresponding to each MUX, and a further subframe may include obtaining measurements for a fourth receiver line corresponding to each MUX).

Based on the initial coverage scan, the processing system is able to determine, for example as shown in FIG. 7, that the top eleven receiver lines measured during the initial coverage scan were covered, while the bottom five receiver lines measured during the initial coverage scan are not sufficiently covered—e.g., based on measurements from the top eleven receiver lines being sufficiently close to respective reference measurements (e.g., within a predetermined threshold relative to the respective reference measurements) and measurements from the bottom five receiver lines not being sufficiently close to respective reference measurements (e.g., not within the predetermined threshold relative to the respective reference measurements). Thus, based on this determination, when imaging an input object on the sensing region, the processing system avoids using the bottom five receiver lines as reference receiver lines (e.g., via the respective MUXs 702 disconnecting those lines from the shared reference output during imaging). However, even if none of the bottom five receiver lines are used as reference receiver lines, some or all of these five receiver lines may still be measured during the imaging of the input object.

It will be appreciated that in accordance with the configuration shown in FIG. 7, multiple receiver lines can be measured simultaneously. The ability to measure multiple receiver lines simultaneously is constrained by the number of separate measurement circuits available for simultaneous measurement (in the configuration shown in FIG. 7, four subframes can be captured to obtain measurements from all sixteen receiver lines, each subframe involving simultaneous measurement of ¼ of the total number of receiver lines across all stages of a CDM sequence. Generally, a processing system having more measurement circuits means more lines can be simultaneously measured for shorter capture time, at the expense of greater silicon area being needed for analog measurement circuits.

It will be appreciated that the processing system components shown in FIG. 7 are merely exemplary. In other exemplary embodiments, the processing system may further include one or more variable-gain amplifiers (VGAs). In further other exemplary embodiments, each receiver line may have a dedicated measurement circuit, and the processing system may not include MUXs. It will further be appreciated that the components of the processing system shown in FIG. 7 may be formed as part of a sensor chip and/or a controller, with processor-executable instructions stored on a non-transitory computer-readable medium that are executable by a processor.

In different exemplary embodiments, the initial determination of which receivers electrodes are covered (or not covered) by an input object (e.g., in accordance with stage 503 discussed above with respect to FIG. 5) may be performed in different ways. It will be appreciated that the exemplary process for performing the initial coverage scan described above with respect to FIG. 7 is merely exemplary.

In another exemplary embodiment, multiple transmitter electrodes of the plurality of transmitter electrodes of the capacitive sensor may be driven with sensing signals, and then the detected signals received on particular receiver electrodes are compared to a threshold to determine whether or not each particular receiver electrode is covered by an input object. These multiple transmitter electrodes may be a subset of the plurality of transmitter electrodes of the capacitive sensor.

For example, in the context of the exemplary device structure shown in FIG. 6, TX1, TX4 and TX7 may be simultaneously driven with "+" phase sensing signals, and a reading corresponding to each receiver electrode is taken. The threshold may be set at a level such that, if at least two of three pixels being evaluated for each receiver electrode during the initial determination are substantially covered, the entire receiver electrode is determined as being sufficiently covered to be included in the scanning process. Thus, each of RX1-RX5 in FIG. 6 would be determined as being sufficiently covered, while RX6 and RX7 in FIG. 6 would be determined as not being sufficiently covered.

It will be appreciated that, in other examples, a different combination of transmitter electrodes may be driven and/or a different configuration of "+" and/or "−" phase sensing signals may be used to simultaneously drive those transmitter electrodes. It is preferred that a non-zero rowsum is used to drive the transmitter electrodes for the initial determination step to ensure adequate contrast between a sufficiently covered receiver electrode and an insufficiently covered receiver electrode. In an exemplary embodiment, a zero rowsum is used for image capture (e.g., corresponding to stage 505 of FIG. 5) while a non-zero rowsum is used for the initial coverage scan (e.g., corresponding to stage 503 of FIG. 5). By using a non-zero rowsum for the initial coverage scan, the processing system can quickly and more easily check which amplifier is saturated.

It will further be appreciated that, as mentioned above, the initial determination of which receivers electrodes are covered by an input object may be performed in a single iteration of a simultaneous multiple drive and/or CDM scheme through each of the receiver electrodes.

In yet another exemplary embodiment, the initial determination of which receivers electrodes are covered (or not covered) by an input object is based on scanning the complete sensing area corresponding to the sensor electrodes of the capacitive sensor to generate an image of the sensing area, and then determining which receiver electrodes of the plurality of receiver electrodes are covered by the input object based on the image. This determination may thus include, for example, evaluating an image of the sensing area generated by the initial scan to determine which receiver electrodes are covered.

It will be appreciated that embodiments of the disclosure are not limited to the exemplary capacitive sensor environment of having an array of receiver electrodes overlapping an array of transmitter electrodes in a square grid as shown in the figures. These principles may also be used with respect to other capacitive sensor environments having other arrangements of transmitter and receiver electrodes as well.

Figure 8:
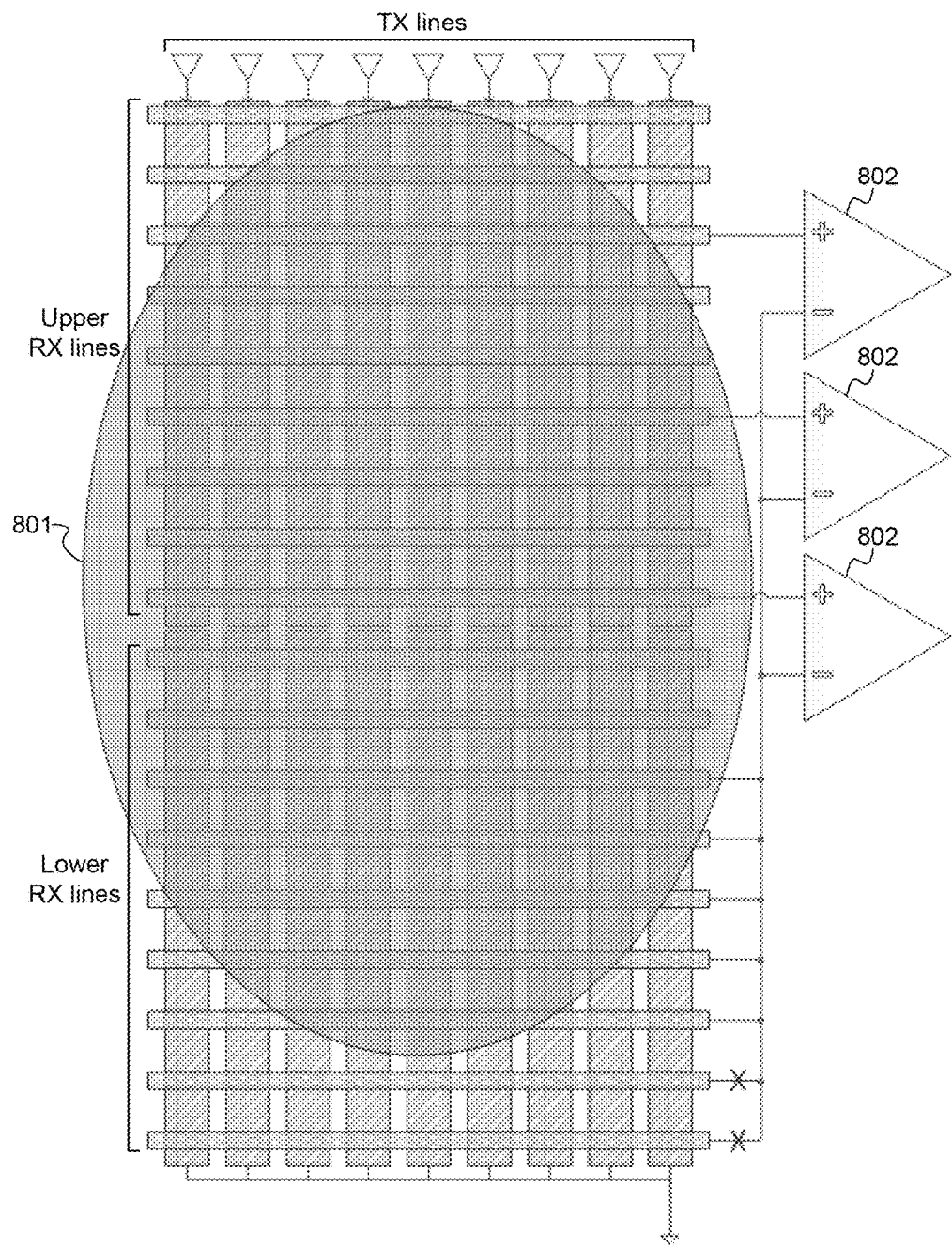
FIG. 8 is a schematic diagram illustrating the operation of components of a capacitive sensor and a processing system in another exemplary embodiment.

Other examples of exemplary capacitive sensing environments include a capacitive sensor with a split-drive differential sensing configuration, as depicted in FIG. 8. In this exemplary environment, the receiver lines from the lower half of the sensor array may be used as a reference while receiver lines from the upper half of the sensor array are being read, and vice-versa. Thus, in the example depicted in FIG. 8, in an exemplary embodiment of the disclosure, while the lower half of the sensor array is being used as a reference for multiple receiver lines being read from the upper half of the sensor array by LNAs 802, certain receiver electrodes from the lower half are excluded from being used for the reference based on an initial determination of which receiver electrodes are covered (or not covered) by the input object 801 (e.g., in accordance with stage 503 discussed above with respect to FIG. 5)

It will be appreciated that the principles described herein (e.g., with respect to FIG. 5) may also be applied to other types of sensors, including, for example, absolute capacitance sensors, matrix arrays, optical sensors, etc.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An input device for capacitive sensing, comprising:
a plurality of sensor electrodes, the plurality of sensor electrodes comprising a plurality of transmitter electrodes and a plurality of receiver electrodes, wherein the plurality of transmitter electrodes is configured to be driven by sensing signals and the plurality of receiver electrodes is configured to receive detected signals corresponding to respective sensing signals driven onto the plurality of transmitter electrodes; and
a processing system, configured to:
determine which receiver electrodes of the plurality of receiver electrodes are covered by an input biometric object; and
scan the input biometric object to determine features of the input biometric object, wherein scanning the input biometric object comprises performing a differential measurement for one or more receiver electrodes with other receiver electrodes providing a reference, based on detected signals received on the one or more receiver electrodes and the other receiver electrodes providing the reference, wherein all of the other receiver electrodes providing the reference were determined as being covered by the input biometric object.

2. The input device according to claim 1, wherein determining which receiver electrodes of the plurality of receiver electrodes are covered by the input biometric object further comprises:
   driving multiple transmitter electrodes of the plurality of transmitter electrodes with sensing signals; and
   comparing detected signals received on a particular receiver electrode to a threshold, wherein the particular receiver electrode is determined as being covered or not being covered based on the comparison to the threshold.

3. The input device according to claim 2, wherein the multiple transmitter electrodes of the plurality of transmitter electrodes are a subset of the plurality of transmitter electrodes.

4. The input device according to claim 2, wherein the multiple transmitter electrodes are driven with a non-zero rowsum.

5. The input device according to claim 1, wherein determining which receiver electrodes of the plurality of receiver electrodes are covered by the input biometric object further comprises:
   scanning a sensing area corresponding to the plurality of sensor electrodes; and
   performing the determination of which receiver electrodes of the plurality of receiver electrodes are covered by the input biometric object based on the scan of the sensing area.

6. The input device according to claim 5, wherein the scan of the sensing area generates an image of the sensing area, and performing the determination of which receiver electrodes of the plurality of receiver electrodes are covered by the input biometric object is based on evaluating the image of the sensing area.

7. The input device according to claim 1, wherein scanning the input biometric object comprises:
   simultaneously driving multiple transmitter electrodes of the plurality of transmitter electrodes with sensing signals.

8. The input device according to claim 1, wherein each receiver electrode of the plurality of receiver electrodes is configured to be disconnected from the processing system by a respective switch.

9. The input device according to claim 1, wherein determining which receiver electrodes of the plurality of receiver electrodes are covered by the input biometric object is part of a process configured to be performed by the processing system for determining whether the input biometric object is settled relative to the input device.

10. A method for capacitive sensing, comprising:
   determining, by a processing system of an input device comprising a plurality of receiver electrodes and a plurality of transmitter electrodes, which receiver electrodes of the plurality of receiver electrodes are covered by an input biometric object; and
   scanning, by the processing system, the input biometric object, wherein scanning the input biometric object comprises performing a differential measurement for one or more receiver electrodes with other receiver electrodes providing a reference, based on detected signals received on the one or more receiver electrodes and the other receiver electrodes providing the reference, wherein all of the other receiver electrodes providing the reference were determined as being covered by the input biometric object.

11. The method according to claim 10, wherein determining which receiver electrodes of the plurality of receiver electrodes are covered by the input biometric object further comprises:
   driving multiple transmitter electrodes of the plurality of transmitter electrodes with sensing signals; and
   comparing detected signals received on a particular receiver electrode to a threshold, wherein the particular receiver electrode is determined as being covered or not being covered based on the comparison to the threshold.

12. The method according to claim 11, wherein the multiple transmitter electrodes are driven with a non-zero rowsum.

13. The method according to claim 10, wherein determining which receiver electrodes of the plurality of receiver electrodes are covered by the input biometric object further comprises:
   scanning a sensing area corresponding to the plurality of sensor electrodes; and
   performing the determination of which receiver electrodes of the plurality of receiver electrodes are covered by the input biometric object based on the scan of the sensing area.

14. The method according to claim 13, wherein scanning the sensing area generates an image of the sensing area, and performing the determination of which receiver electrodes of the plurality of receiver electrodes are covered by the input biometric object is based on evaluating the image of the sensing area.

15. The method according to claim 10, wherein scanning the input biometric object comprises:
   simultaneously driving multiple transmitter electrodes of the plurality of transmitter electrodes with sensing signals.

16. The method according to claim 10, wherein each receiver electrode of the plurality of receiver electrodes is configured to be disconnected from the processing system by a respective switch.

17. The method according to claim 10, wherein determining which receiver electrodes of the plurality of receiver electrodes are covered by the input biometric object is part of a process for determining whether the input biometric object is settled relative to the input device.

18. A processing system for capacitive sensing, the processing system comprising:
   a non-transitory, computer-readable medium having processor-executable instructions stored thereon; and
   a processor, configured, based on execution of the processor-executable instructions, for:
      determining which receiver electrodes of the plurality of receiver electrodes are covered by an input biometric object; and
      scanning the input biometric object to determine features of the input biometric object, wherein scanning the input biometric object comprises performing a differential measurement for one or more receiver electrodes with other receiver electrodes providing a reference, based on detected signals received on the one or more receiver electrodes and the other receiver electrodes providing the reference, wherein all of the other receiver electrodes providing the reference were determined as being covered by the input biometric object.

19. The processing system according to claim 18, wherein determining which receiver electrodes of the plurality of receiver electrodes are covered by the input biometric object further comprises:
  driving multiple transmitter electrodes of the plurality of transmitter electrodes with sensing signals; and
  comparing detected signals received on a particular receiver electrode to a threshold, wherein the particular receiver electrode is determined as being covered or not being covered based on the comparison to the threshold.

20. The processing system according to claim 18, wherein scanning the input biometric object comprises:
  simultaneously driving multiple transmitter electrodes of the plurality of transmitter electrodes with sensing signals.

* * * * *